(12) United States Patent
Cleveland (10) Patent No.: US 7,454,167 B2
(45) Date of Patent: Nov. 18, 2008

(54) APPARATUS AND METHOD FOR ECHO CANCELLATION IN A WIRELESS REPEATER USING CROSS-POLARIZED ANTENNA ELEMENTS

(75) Inventor: Joseph R. Cleveland, Murphy, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 705 days.

(21) Appl. No.: 11/145,654

(22) Filed: Jun. 6, 2005

(65) Prior Publication Data

US 2006/0014491 A1    Jan. 19, 2006

Related U.S. Application Data

(60) Provisional application No. 60/587,704, filed on Jul. 14, 2004, provisional application No. 60/587,705, filed on Jul. 14, 2004.

(51) Int. Cl.
*H04Q 7/20* (2006.01)
*H04Q 7/32* (2006.01)

(52) U.S. Cl. .............................. 455/17; 455/7; 455/11.1; 455/24; 455/39; 455/500; 370/315; 370/317; 370/316; 370/279

(58) Field of Classification Search ................... 455/17, 455/7, 11.1, 24, 39, 10, 500, 517, 422.1, 455/403, 426.1, 426.2, 454, 8, 9, 15, 23, 455/41.1, 41.2, 501, 550.1, 506, 63.1, 67.11, 455/571; 370/315, 317, 316, 279
See application file for complete search history.

(56) References Cited

U.S. PATENT DOCUMENTS

| | | | |
|---|---|---|---|
| 2004/0176027 A1 * | 9/2004 | O'Neil | 455/7 |
| 2005/0250442 A1 * | 11/2005 | Dore et al. | 455/13.1 |
| 2005/0286448 A1 * | 12/2005 | Proctor et al. | 370/279 |

* cited by examiner

*Primary Examiner*—Keith T Ferguson (57) ABSTRACT

A repeater for re-transmitting uplink and downlink signals in a wireless network. The repeater uses antenna cross-polarization, signal cancellation and digital processing techniques to reduce or eliminate coupling of echo signals between the receive and transmit antennas of the downlink and uplink signal paths in the repeater.

20 Claims, 8 Drawing Sheets

APPARATUS AND METHOD FOR ECHO CANCELLATION IN A WIRELESS REPEATER USING CROSS-POLARIZED ANTENNA ELEMENTS

CROSS-REFERENCE TO RELATED APPLICATIONS AND CLAIM OF PRIORITY

The present invention is related to that disclosed in U.S. Provisional Patent Application Ser. No. 60/587,704, filed Jul. 14, 2004, entitled "Method and Procedure for Reduction of Echo or Feedback Signals in a FDD Wireless Repeater Using Signals Coupled Into Cross-Polarized Antenna Elements" and U.S. Provisional Patent Application Ser. No. 60/587,705, filed Jul. 14, 2004, entitled "Method and Procedure for Reduction of Echo or Feedback Signals in a TDD Wireless Repeater Using Signals Coupled Into Cross-Polarized Antenna Elements". U.S. Provisional Patent Application Ser. Nos. 60/587,704 and 60/587,705 are assigned to the assignee of the present application. The subject matter disclosed in each of U.S. Provisional Patent Application Ser. Nos. 60/587,704 and 60/587,705 is hereby incorporated by reference into the present disclosure as if fully set forth herein. The present invention hereby claims priority under 35 U.S.C. §119(e) to U.S. Provisional Patent Application Ser. Nos. 60/587,704 and 60/587,705.

TECHNICAL FIELD OF THE INVENTION

The present invention relates generally to communication networks and, more specifically, to a wireless network repeater that uses cross-polarized antenna elements to cancel echo signals in a TDD and FDD wireless networks.

BACKGROUND OF THE INVENTION

Consumers use a wide range of devices and networks, including cellular phones, paging devices, personal communication services (PCS) systems, and wireless data networks. Wireless service providers create new markets for wireless devices and expand existing markets by making wireless devices and services cheaper and more reliable. Wireless service providers attract new customers by reducing infrastructure costs and operating costs, by increasing handset battery life, and improving quality of service, and new and better features.

Inadequate coverage is a persistent problem in the quality of service of any wireless network. Natural and man-made obstacles frequently create radio frequency (RF) "holes" in the coverage area of a wireless network. Voice and data call connections are frequently dropped when a wireless terminal, such as a cell phone or a similar mobile station, enters an RF hole. Mobile stations that are already in an RF hole may not be able to reliably establish new connections. Typical areas in which RF holes occur include underground tunnels, buildings that have large footprints, tall buildings, and underground shopping malls.

Wireless service providers may attempt to improve coverage by deploying RF repeater transceivers. A variety of repeaters have been developed to improve the coverage of wireless networks. In U.S. patent application Ser. No. 09/998,238 (Publication No. 20030104781), Son describes a residential wireless repeater that achieves isolation between transmit and receive antennas by physical separation of the antennas. The repeater disclosed by Son requires two separate modular repeaters that communicate simultaneously with each other with low radio frequency.

In U.S. Pat. No. 6,731,904, Judd describes a modular repeater that includes a housing having a pair of substantially 180° oppositely facing surfaces. At least one antenna element is mounted to each of these surfaces for radiating energy in a direction opposite that of another antenna element mounted to the other surface. An electronic circuit within the housing operatively couples signals between at least one antenna element on each of the oppositely facing surfaces of the module housing.

In U.S. Pat. No. 6,697,603, Lovinggood et al. describe a digital repeater for receiving and retransmitting radio frequency (RF) signals. The Lovinggood repeater down-converts a received RF signal to an intermediate frequency (IF) signal, converts the IF signal into a digital signal, processes and amplifies the digital signal into an amplified signal using the digital signal processor, and converts the amplified signal into an analog signal. The Lovinggood repeater then up-converts the analog signal to an outgoing RF signal suitable for antenna transmission.

In U.S. Pat. No. 6,640,112, Lee et al. describe a repeating method for a wireless communication system which provides time and space diversities. The method of repeating a forward link communication signal for a wireless communication system includes the steps of: a) transmitting the forward link communication signal through a first transmitting antenna; b) delaying the forward link communication signal for a predetermined time period; and c) transmitting a delayed forward link communication signal which is generated by step b) through a second transmitting antenna.

In U.S. Pat. No. 4,283,795, Steinberger presents an adaptive cross-polarization cancellation arrangement in which a first desired polarized signal and a second interfering orthogonally polarized signal, including cross-polarization components, are concurrently received at an antenna. The orthogonally polarized components of the received signal are separated and transmitted along separate paths and recombined after the phase and amplitude of the separated polarized interfering signal sample have been adjusted for maxim cancellation of cross-polarization components in the other path.

Each of the prior art repeaters described above requires at least one of the following: i) physical separation of primary and secondary antenna sets by a significant distance to reduce the magnitude of the transfer function H such that H<1/G, where G is the repeater power gain; ii) precise adjustment of input-output phase adjustment embodied in H such that the vector product G*H is <0 in order to yield negative feedback; iii) separate modules for the reception of external signals and the retransmission of signals internal to the building; and iv) methods for the cancellation of multiple time-delayed echoes that would occur in a home or in-building environment with multiple scattering surfaces. The prior art repeaters generally do not provide a method of canceling any echoes from the output that would lead to unstable operation (i.e., oscillations).

Therefore, there is a need in the art for improved repeaters for use in wireless networks. In particular, there is a need for a repeater that cancels echoes and avoids oscillation.

SUMMARY OF THE INVENTION

The present invention provides a method and procedure for reduction of feedback between an output antenna and an input antenna that could cause instabilities or oscillations in a wireless repeater for use wireless networks. The method and procedure uses antenna cross-polarization, signal cancellation and digital processing techniques to reduce or eliminate coupling of echo signals between the receive and transmit antennas of the down-link and up-link signal paths in the repeater.

To address the above-discussed deficiencies of the prior art, it is a primary object of the present invention to provide, for use in a wireless network, a repeater capable of re-transmitting a downlink signal transmitted from a base station to a mobile station in a forward channel. According to an advantageous embodiment of the present invention, the repeater comprises: 1) a first antenna for receiving an incoming downlink signal from the base station; 2) a second antenna for transmitting an outgoing downlink signal to the mobile station, wherein the second antenna is cross-polarized with respect to the first antenna; and 3) a third antenna for receiving from the second antenna a downlink echo signal derived from the outgoing downlink signal, wherein the third antenna is co-polarized with respect to the second antenna and cross-polarized with respect to the first antenna.

According to one embodiment of the present invention, the repeater further comprises a transceiver chain capable of down-converting the incoming downlink signal to a down-converted downlink signal and down-converting the downlink echo signal to a down-converted downlink echo signal, wherein the transceiver chain is further capable of using the down-converted downlink echo signal to reduce in the down-converted downlink signal a corresponding downlink echo signal derived from the outgoing downlink signal.

According to another embodiment of the present invention, the repeater is further capable of re-transmitting an uplink signal transmitted from the mobile station to the base station in a reverse channel.

According to still another embodiment of the present invention, the second antenna receives an incoming uplink signal from the mobile station and the first antenna transmits an outgoing uplink signal to the base station.

According to yet another embodiment of the present invention, the repeater further comprises a fourth antenna for receiving from the first antenna an uplink echo signal derived from the outgoing uplink signal, wherein the fourth antenna is co-polarized with respect to the first antenna and cross-polarized with respect to the third antenna.

According to a further embodiment of the present invention, the transceiver chain is further capable of down-converting the incoming uplink signal to a down-converted uplink signal and down-converting the uplink echo signal to a down-converted uplink echo signal and wherein the transceiver chain is further capable of using the down-converted uplink echo signal to reduce in the down-converted uplink signal a corresponding uplink echo signal derived from the outgoing uplink signal.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

FIGS. 1 through 8, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged RF repeater transceiver.

Figure 1:
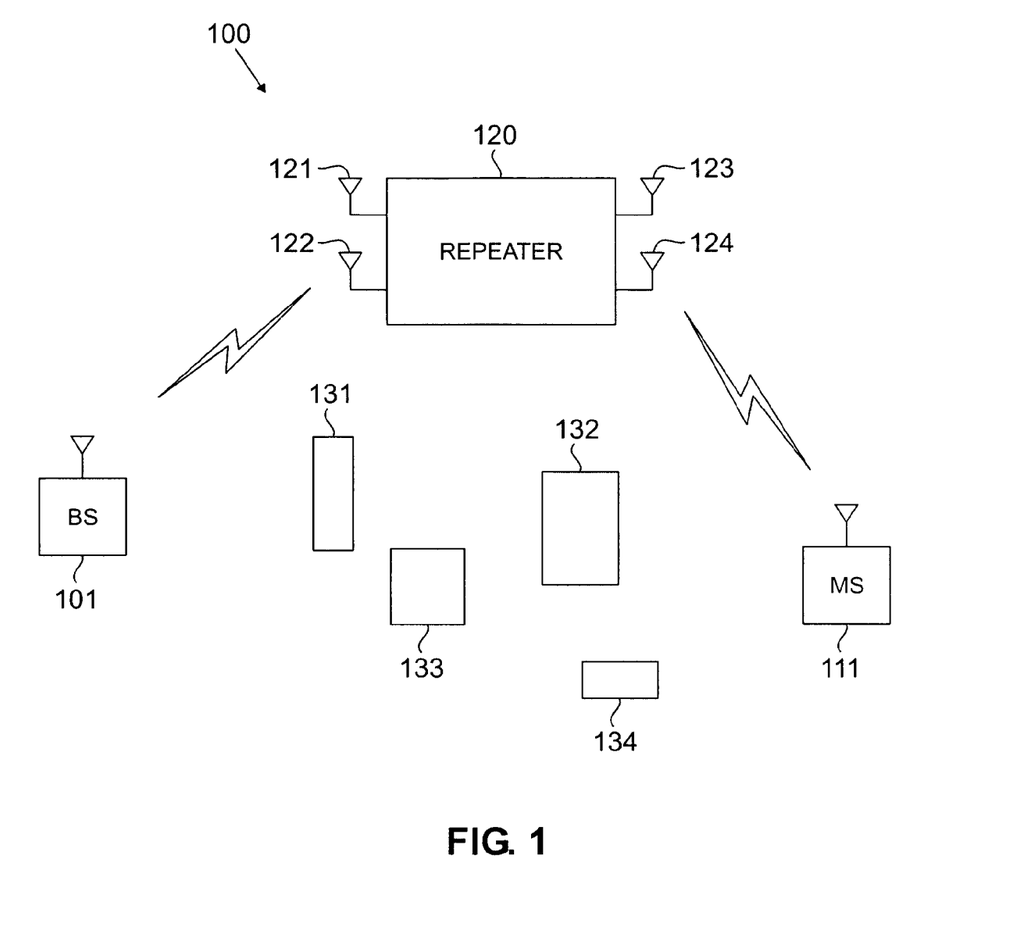
FIG. 1 illustrates an exemplary wireless network in which a repeater according to the principles of the present invention may be implemented.

FIG. 1 illustrates exemplary wireless network 100, which implements repeater 120 according to the principles of the present invention. Wireless network 100 comprises base station (BS) 101 and other base stations (not shown) that communicate with a plurality of mobile stations, such as mobile station (MS) 111, located in a coverage area of wireless network 100. In a first advantageous embodiment of the present invention, base station (BS) 101 may communicate with mobile station (MS) 111 over time-division duplexed (TDD) channels. The TDD channels may use, for example, code division multiple access (CDMA) signals or orthogonal frequency division multiple access (OFDMA) signals. In a second advantageous embodiment of the present invention, base station (BS) 101 may communicate with mobile station (MS) 111 over frequency-division duplexed (FDD) channels.

MS 111 may be any suitable wireless device, including a conventional cellular radiotelephone, a PCS handset device, a personal digital assistant (PDA), a portable computer, a telemetry device, or the like, that is capable of communicating with BS 101 via wireless links. The present invention is not limited to use with mobile devices. Other types of wireless access terminals, including fixed wireless terminals, may be used. For the sake of simplicity, only a mobile station is shown and discussed herein. However, it should be understood that the use of the term "mobile station" in the claims and in the description below is intended to encompass both stationary wireless terminals and truly mobile wireless terminals.

Wireless network 100 further comprises wireless repeater 120. Forward channel (i.e., downlink) signals from BS 101 to MS 111 and reverse channel (i.e., uplink) signals from MS 111 to BS 101 may be blocked by objects 131-134. Repeater 120 may be used in wireless network 100 to extend the coverage range of BS 101 to areas, such as the vicinity of MS 111, where blockage or scattering causes large propagation losses. Objects 131-134 may include, for example, tunnels, terrain features (e.g., mountains, valleys), and large buildings.

Repeater 120 comprises donor antennas 121 and 122, which communicates in the forward and reverse channels with BS 101, and server antennas 123 and 124, which communicate in the forward and reverse channels with MS 111. Repeater 120 is placed in a location where the forward channel signals received from BS 101 exceed a specified threshold. Repeater 120 filters and amplifies the received signal and retransmits the signal into the regions where the signal from BS 101 is too low for reliable reception. Repeater 120 performs a similar function in the reverse channel from MS 111 to BS 101.

Figure 2:
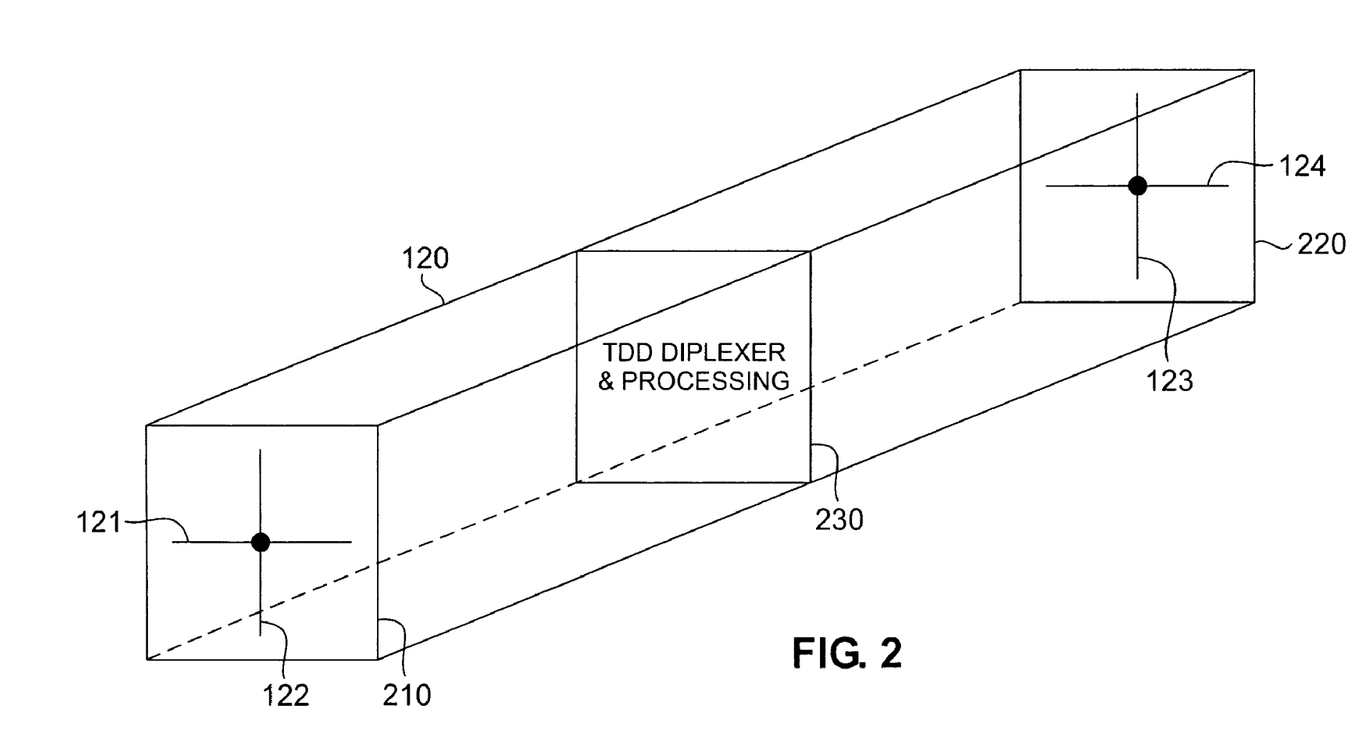
FIG. 2 is an architectural view of an exemplary repeater according to a time-division duplexing (TDD) embodiment of the present invention.

FIG. 2 is an architectural view of exemplary repeater 120 according to a time-division duplexing (TDD) embodiment of the present invention. TDD repeater 120 comprises donor antennas 121 and 122, server antennas 123 and 124, and TDD diplexer and processing block 230. Donor antenna 121 and donor antenna 122 are mounted on a first surface (i.e., surface 210) of the housing of repeater 120. Server antenna 123 and server antenna 124 are mounted on a second surface (i.e., surface 220) of the housing of repeater 120. Surfaces 210 and 220 are opposing surfaces on repeater 120.

Donor antenna 121 is cross-polarized with server antenna on the opposite face. Donor antenna 121 receives signals transmitted by BS 101 on the forward channel (downlink) frequency and transmits signals to BS 101 on the reverse channel (uplink) frequency. Server antenna 123 transmits signals to MS 111 on the forward channel (downlink) frequency and receives signals transmitted by MS 111 on the reverse channel (uplink) frequency. A diplexer in TDD diplexer and processing block 230 isolates the downlink and uplink frequencies on the donor and server antennas.

Donor antenna 122 is co-polarized with server antenna 123 and cross-polarized with donor antenna 121 to detect the time-delayed echo signals transmitted by server antenna 123 on the opposite face. Donor antenna 122 receives signals of like polarization transmitted by server antenna 123. Server antenna 124 is co-polarized with donor antenna 121 and cross-polarized with server antenna 123. Server antenna 124 is used to receive the time-delayed echo signals transmitted by donor antenna 121 on the opposite face.

Figure 3:
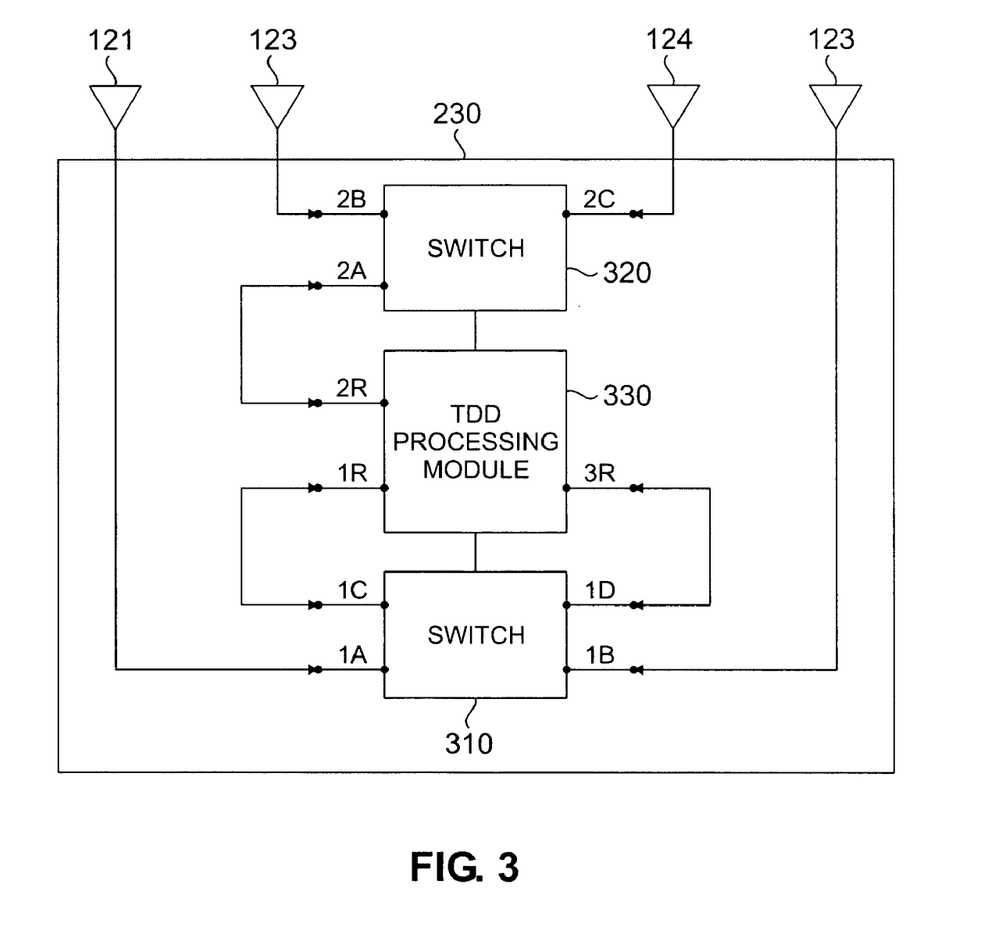
FIG. 3 illustrates the diplexer and TDD processing block in FIG. 2 in greater detail according to an exemplary embodiment of the present invention.

FIG. 3 illustrates TDD diplexer and processing block 230 in greater detail according to an exemplary embodiment of the present invention. TDD diplexer and processing block 230 comprises switch 310, switch 320 and TDD processing module 330. Diplexer switches 310 and 320 switch donor antennas 121 and 122 and server antennas 123 and 124 between the input and output ports of TDD processing module 330, depending on whether forward channel (downlink) signals or reverse channel (uplink) signals are being processed.

In the downlink, switch 310 couples port 1B to port 1C, so that server antenna 123 is coupled to port 1R of TDD processing module 330, and also couples port 1A to port 1D, so that donor antenna 121 is coupled to port 3R of TDD processing module 330. In the downlink, switch 320 couples port 2A to port 2C, so that server antenna 124 is coupled to port 2R of TDD processing module 330.

In the uplink, switch 310 couples port 1A to port 1C, so that donor antenna 121 is coupled to port 1R of TDD processing module 330, and also couples port 1B to port 1D, so that server antenna 123 is coupled to port 3R of TDD processing module 330. In the downlink, switch 320 couples port 2A to port 2B, so that donor antenna 122 is coupled to port 2R of TDD processing module 330.

During the downlink period of TDD operation, TDD processing module 330 adjusts the amplitude and time delay of the echo signals transmitted by server antenna 123 and received by donor antenna 122 to match any echo signals coupled into cross-polarized donor antenna 121. The matched signal is then subtracted from the signal received on donor antenna 121, thereby removing any echo terms that could cause instabilities or positive feedback.

During the uplink period of TDD operation, TDD processing module 330 adjusts the amplitude and time delay of the echo signals transmitted by donor antenna 121 and received by server antenna 124 to match any echo signal coupled into cross-polarized server antenna 123. The matched signal is then subtracted from the signal received on server antenna 123, thereby removing any echo terms that could cause instabilities or positive feedback. TDD processing module 330 provides control signals to cause switches 310 and 320 to change switch states between downlink and uplink communication.

Figure 4:
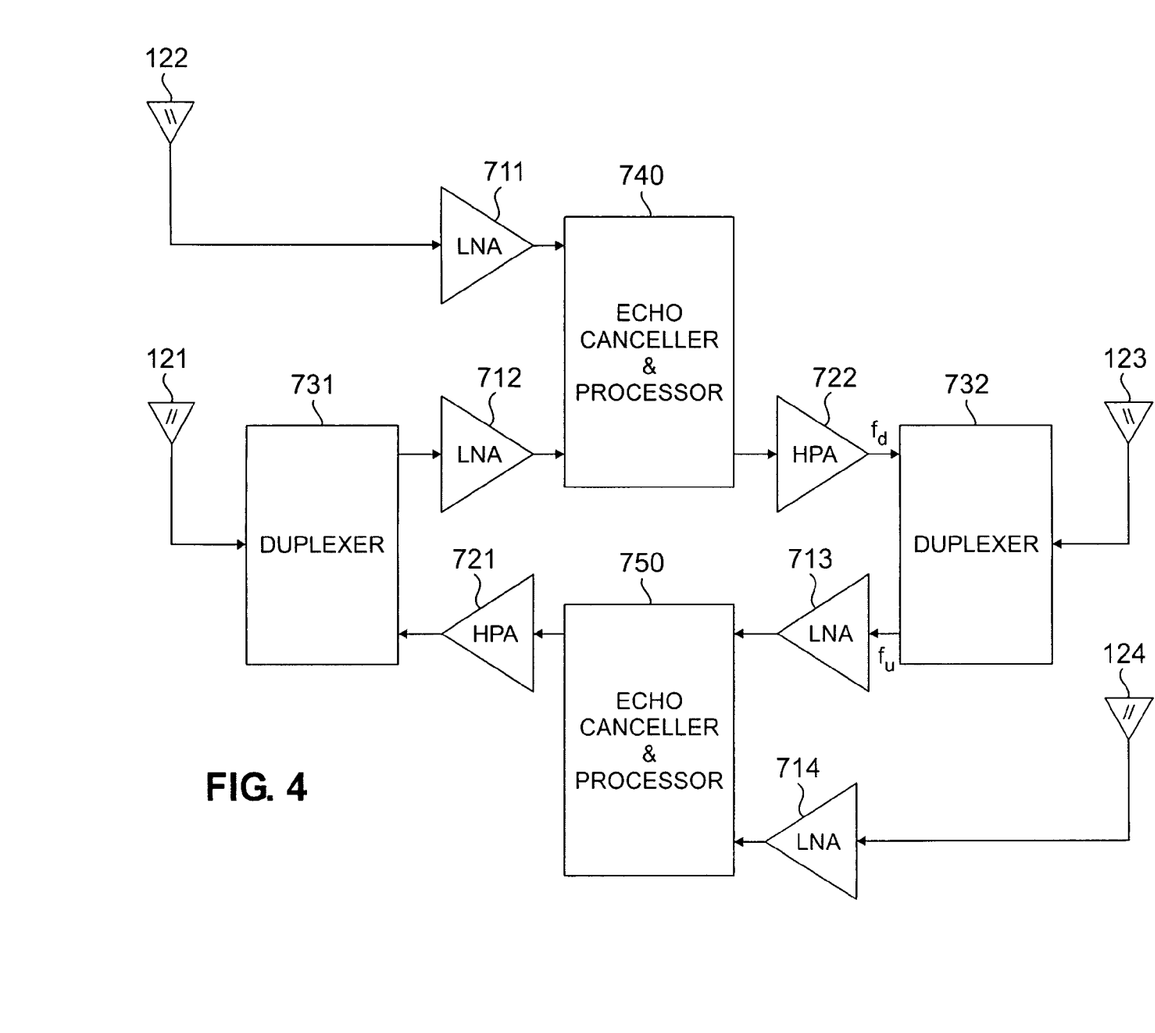
FIG. 4 illustrates the TDD processing module in FIG. 3 in greater detail according to an exemplary embodiment of the present invention.

FIG. 4 illustrates TDD processing module 330 in greater detail according to an exemplary embodiment of the present invention. TDD processing module 330 comprises filters 405, 410 and 435, low-noise amplifier (LNA) 415, low-noise amplifier (LNA) 420, echo canceller and processor 425, high-power amplifier (HPA) 430, and processor 440. Filter 405 removes out-of-band signals from the signal received from switch 310 on port 1R. Filter 410 removes out-of-band signals from the signal received from switch 320 on port 2R.

LNA 415 amplifies the incoming signal received on port 1R to the level required for processing by echo canceller and processor 425. LNA 420 amplifies the incoming signal received on port 2R to the level required for processing by echo canceller and processor 425. Echo processor and canceller 425 determines the amplitude and time delay of the echo signals received on port 2R. Echo canceller and processor 425 then adjusts the amplitude and time delay of the echo signals received on port 2R to match any echo signal on port 1R.

The matched signal is then subtracted from the signal received on donor antenna 121, thereby removing any echo terms that could cause instabilities or positive feedback. The adjusted signal is then amplified by power amplifier 430. Filter 435 removes out-of-band signals present at the output of power amplifier 430. The output signal from filter 435 is then directed to port 3R of TDD processing module 330. For multi-band operation, the center frequency for filters 405, 410 and 435 may be controlled by processor 440.

Figure 5:
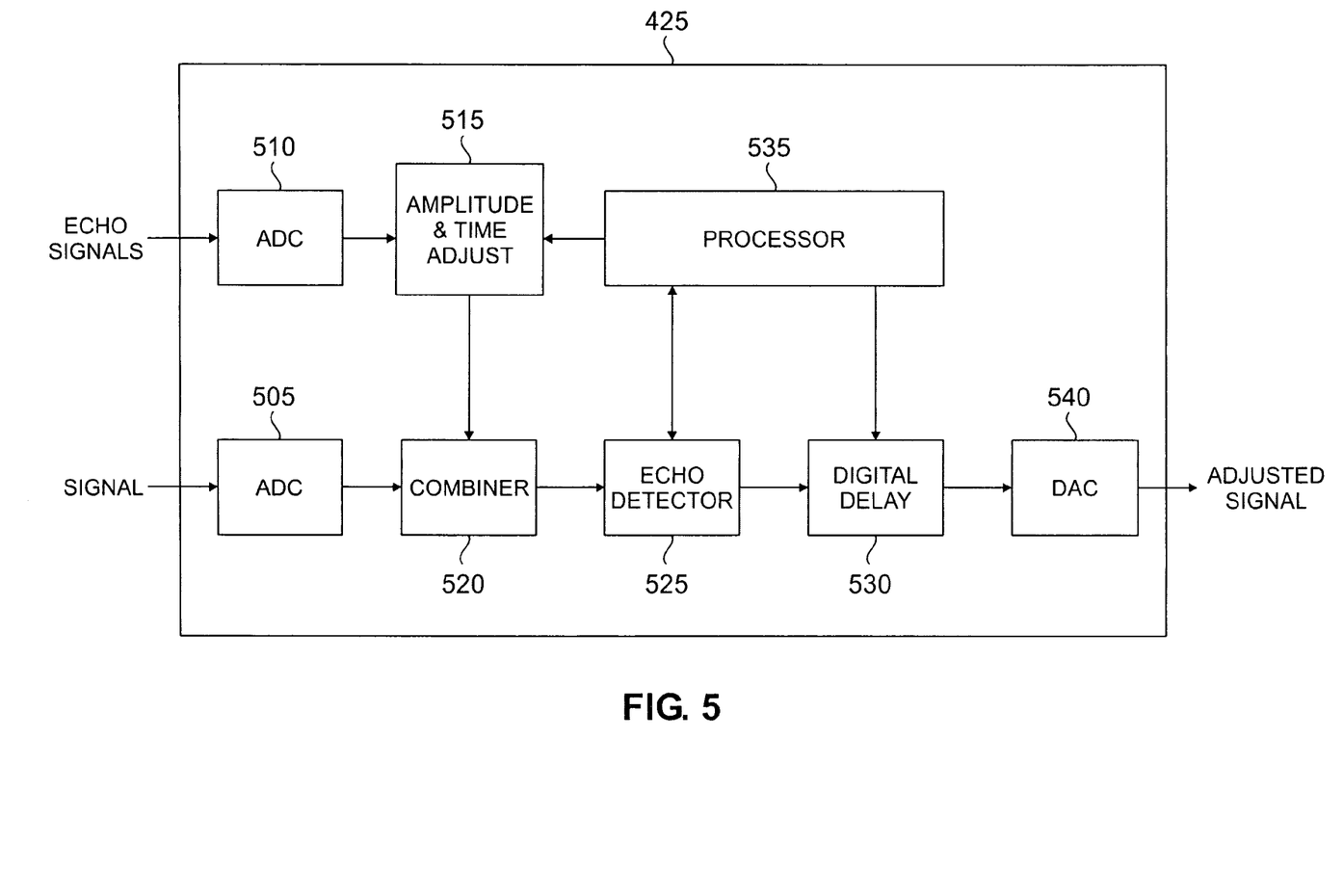
FIG. 5 illustrates the echo canceller and signal processor in FIG. 4 in greater detail according to an exemplary embodiment of the present invention.

FIG. 5 illustrates echo canceller and processor 425 in greater detail according to an exemplary embodiment of the present invention. Echo canceller and processor 425 comprises analog-to-digital converter (ADC) 505, analog-to-digital converter (ADC) 510, amplitude and time adjustment block 515, combiner 520, echo detector 525, digital delay block 530, and digital-to-analog converter (DAC) 540. A clock signal (not shown) synchronizes data transfers between ADC 505, ADC 510, amplitude and time adjustment block 515, combiner 520, echo detector 525, digital delay block 530, processor 535, and DAC 540.

ADC 505 obtains digital samples of the filtered signal on port 1R and stores the samples in memory (not shown). ADC 510 obtains digital samples of the echo signals received on port 2R and stores the echo samples in memory (not shown). The ADC sampling may be performed in the RF band of the received signal or in a digitally down-converted signal at an intermediate frequency. The samples are taken over a time interval that represents the maximum propagation time expected for the latest arriving echo, generally less than 1 microsecond for an indoor environment. To reduce the throughput of sampled data (bits/sec), sub-Nyquist sampling rates in either the RF band or in the IF band may be used. Each one of ADC 505 and 510 has the dynamic range and sampling frequency to differentiate the original, non-delayed signal from the amplified, delayed echo signal.

Processor 535 controls amplitude and time adjustment block 515 to adjust the amplitude and time delay of the digitized echo signal, such that the echo signal is inverted and then combined in combiner 520 with the primary signal. As a result, any echo signal in the primary signal is minimized or removed. Echo detector 525 detects the presence of uncompensated echo signals using, for example, a matched filter, convolution or correlation techniques, digital subscriber line (DSL) echo detection and cancellation techniques, or a combination of these mechanisms. Digital delay block 530 delays the compensated signal in order to de-correlate echo signals received on port 2R.

For multiple echoes with different amplitudes and time delays, echo canceller and processor 425 adapts the relative amplitudes in different time slots to result in cancellation of echo signal from the first donor or server antenna.

Figure 6:
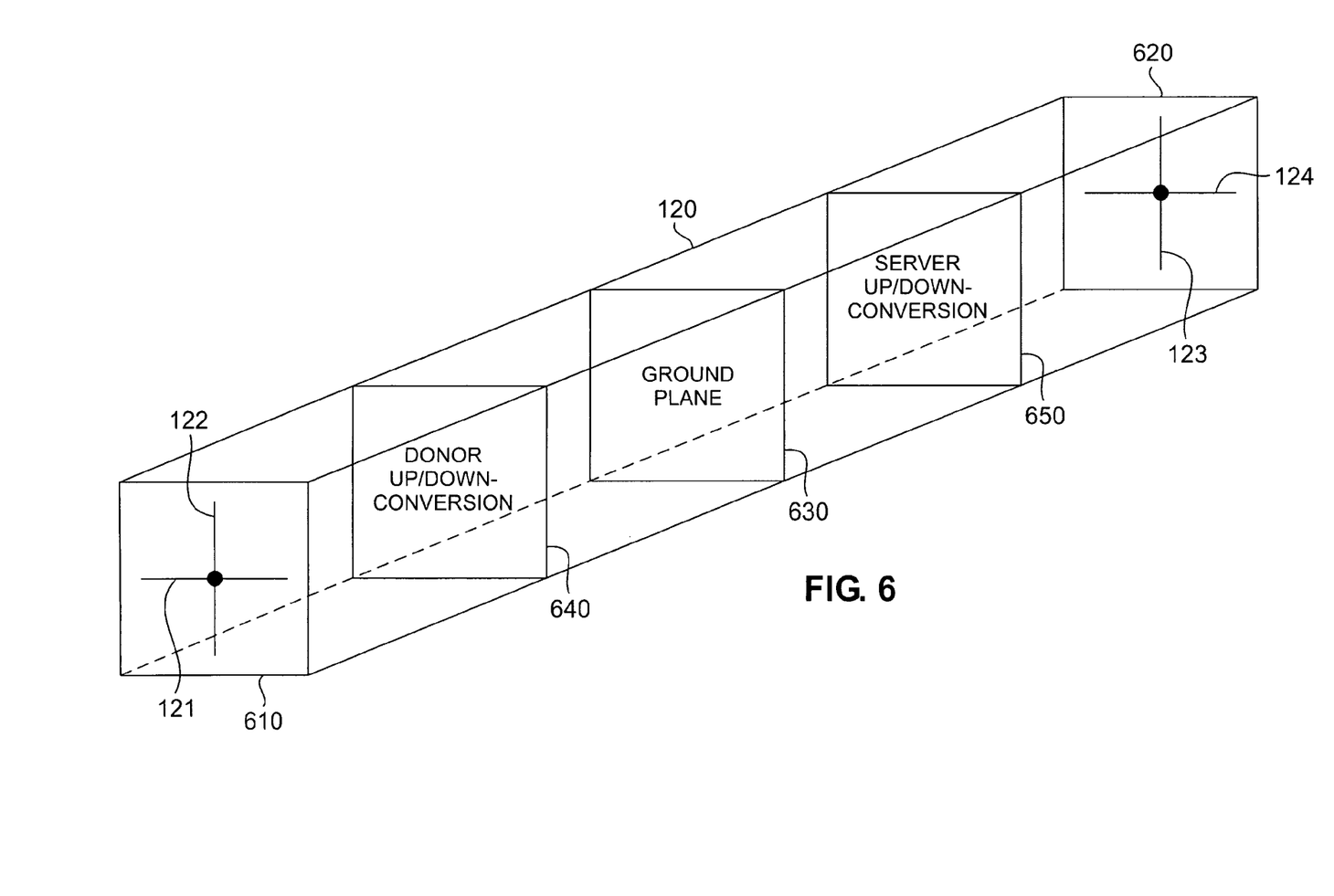
FIG. 6 is an architectural view of an exemplary repeater according to a frequency-division duplexing (FDD) embodiment of the present invention.

FIG. 6 is an architectural view of exemplary repeater 120 according to a frequency-division duplexing (FDD) embodiment of the present invention. In FIG. 6, repeater 120 comprises donor antennas 121 and 122, server antennas 123 and 124, ground plane 630, donor up-conversion and down-conversion circuitry 640, and server up-conversion and down-conversion circuitry 650. Donor antennas 121 and 122 are mounted on surface 610 of the housing of repeater 120. Server antennas 123 and 124 are mounted on surface 620 of the housing of repeater 120. Surfaces 610 and 620 are opposing surfaces.

Modular repeater 120 uses orthogonally-polarized antennas on the opposing surfaces of the housing of repeater 120 for transmission of the desired signals. Each orthogonally-polarized antenna radiates power in a direction opposite to that of the antenna mounted to the opposing surface. Circuitry within the housing couples signals between the antennas on each of the oppositely-facing surfaces of the module.

The circuitry for receiving the low-power signals is isolated from the power amplifier circuits for the down-link and the up-link by shielding techniques well-known in the field. Ground plane 630 comprises suitable filtered feed-through elements that provide additional isolation between the input circuit and the output circuit. This method also reduces the length of antenna feeds, a major source of coupling between co-located antennas.

Donor antenna 121 is cross-polarized with server antenna 123 on the opposite face of repeater 120. Donor antenna 121 receives signals transmitted by BS 101 on the down-link frequency and transmits signals to BS 101 on the up-link frequency. Server antenna 123 transmits signals to MS 111 on the down-link frequency and receives signals from MS 111 on the uplink frequency. A duplexer isolates the down-link and up-link frequencies on the donor and server antennas.

Donor antenna 122 is co-polarized with server antenna 123 and cross-polarized with donor antenna 121. Donor antenna 122 detects the time-delayed echo signals transmitted by server antenna 123 on the opposite surface of repeater 120. Donor antenna 122 receives signals of like polarization transmitted by server antenna 123. Server antenna 124 is co-polarized with donor antenna 121 and cross-polarized with server antenna 123. Server antenna 124 detects the time-delayed echo signals transmitted by donor antenna 121 on the opposite face of repeater 120. Server antenna 124 receives signals of like polarization transmitted by donor antenna 121.

Figure 7:
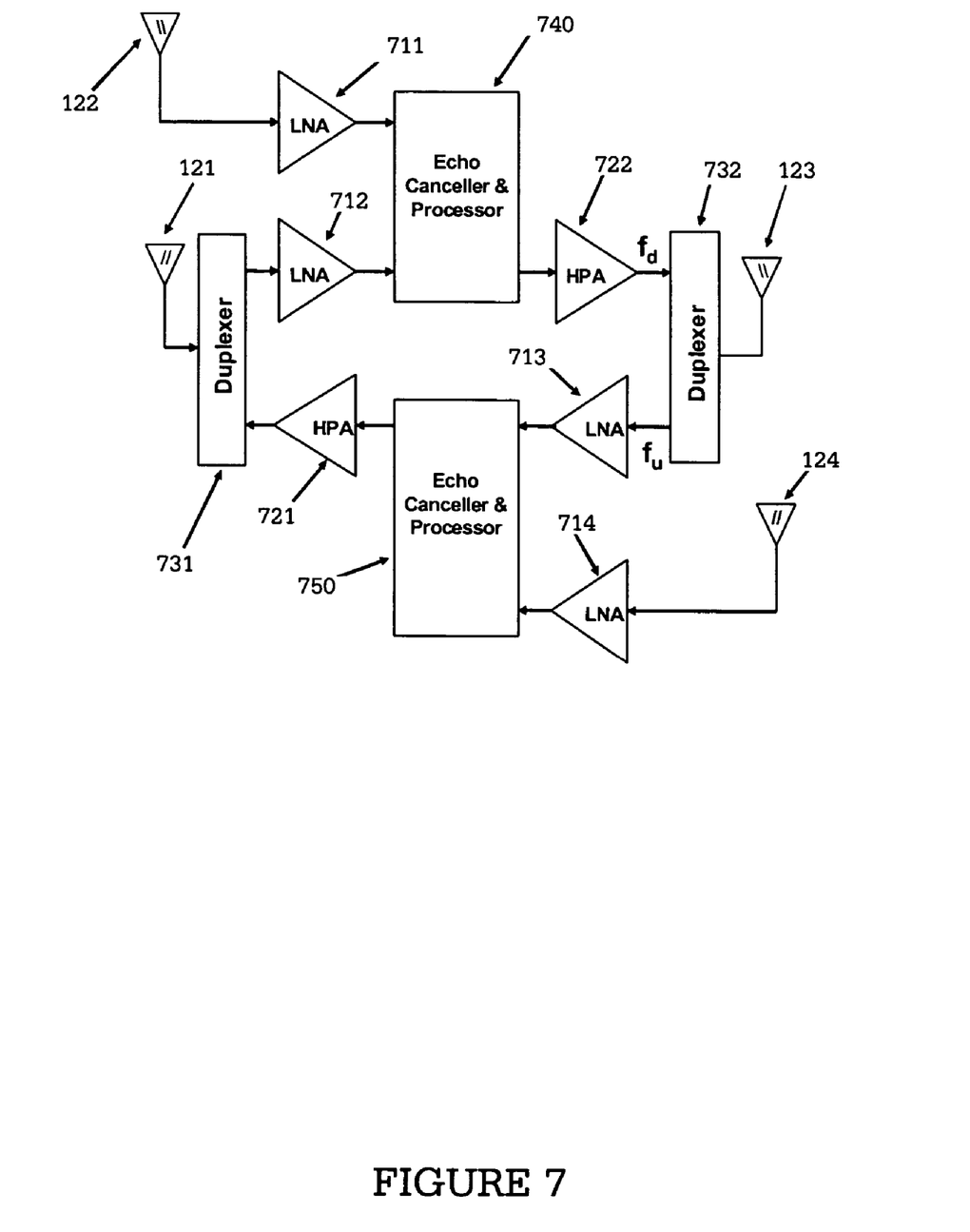
FIG. 7 illustrates the repeater in FIG. 6 in greater detail according to an exemplary embodiment of the present invention.

FIG. 7 illustrates repeater 120 in greater detail according to the exemplary frequency-division duplexing (FDD) embodiment of the present invention in FIG. 6. Repeater 120 comprises donor antennas 121 and 122, server antennas 123 and 124, low-noise amplifiers 711-714, high-power amplifiers 721 and 722, and duplexers 731 and 732. Repeater 120 further comprises echo canceller and processor 740 and echo canceller and processor 750.

Low-noise amplifier (LNA) 712 amplifies downlink signals transmitted by BS 101 and received from donor antenna 121 and duplexer 731. LNA 712 outputs the amplified downlink signals to echo canceller and processor 740. Low-noise amplifier (LNA) 713 amplifies uplink signals transmitted by MS 111 and received from server antenna 123 and duplexer 732. LNA 713 outputs the amplified uplink signals to echo canceller and processor 750.

Low-noise amplifier (LNA) 711 amplifies downlink echo signals transmitted by server antenna 123 and detected by donor antenna 122. LNA 711 outputs the amplified echo signals to echo canceller and processor 740. Low-noise amplifier (LNA) 714 amplifies uplink echo signals transmitted by donor antenna 121 and detected by server antenna 124. LNA 714 outputs the amplified echo signals to echo canceller and processor 750.

Echo canceller and processor 740 removes the downlink echo signals received from LNA 711 from the downlink signals received from LNA 712. The echo-cancelled output of echo canceller and processor 740 is amplified by high-power amplifier (HPA) 722 and transmitted to MS 111 via duplexer 732 and antenna 123. Echo canceller and processor 750 removes the uplink echo signals received from LNA 714 from the uplink signals received from LNA 713. The echo-cancelled output of echo canceller and processor 750 is amplified by high-power amplifier (HPA) 721 and transmitted to BS 101 via duplexer 731 and antenna 121.

Figure 8:
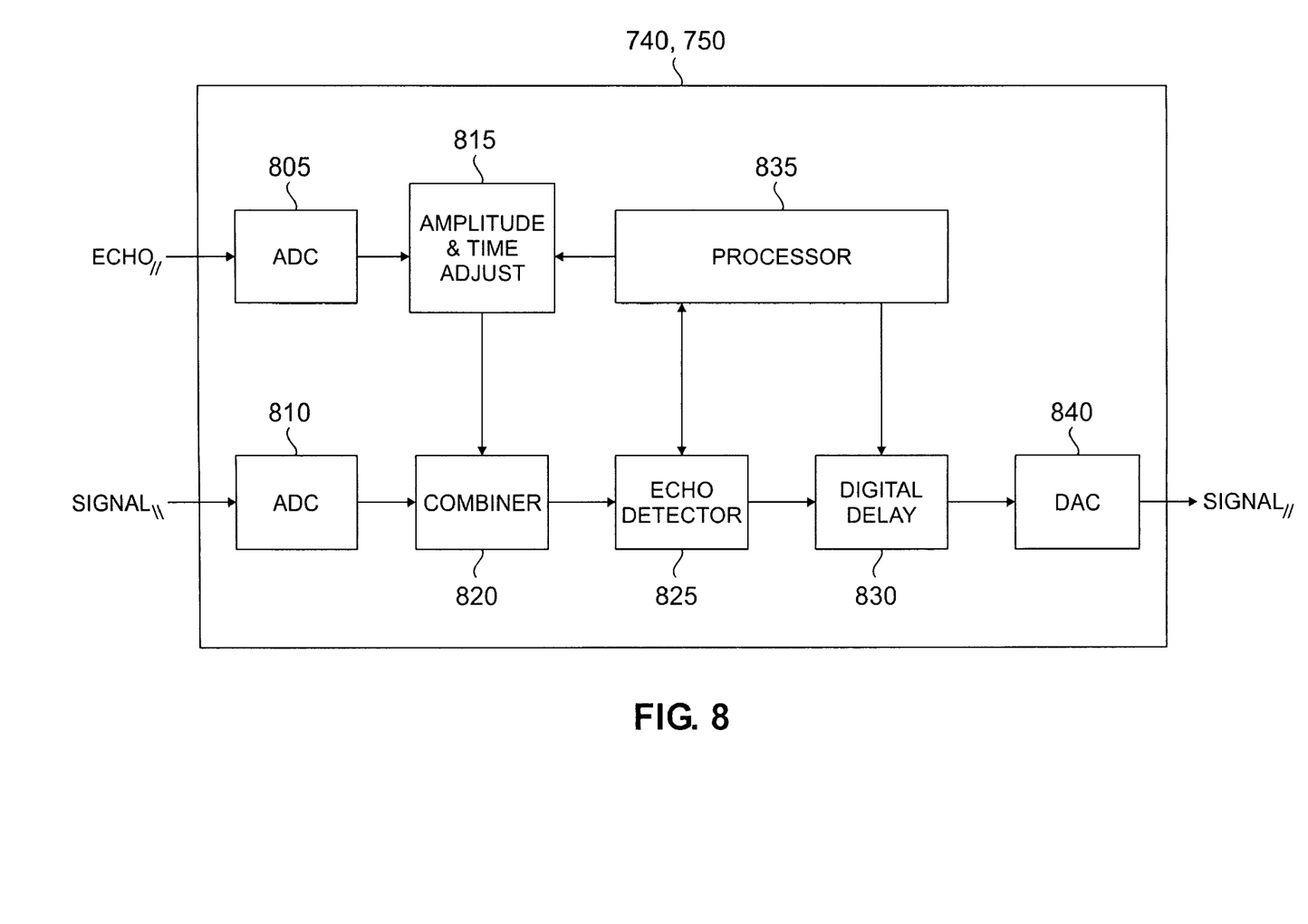
FIG. 8 illustrates the echo canceller and signal processor in FIG. 7 in greater detail according to an exemplary embodiment of the present invention.

FIG. 8 illustrates echo canceller and signal processor 740 and 750 in FIG. 7 in greater detail according to an exemplary embodiment of the present invention. Echo canceller and signal processor 740 (750) comprises analog-to-digital converter (ADC) 805, analog-to-digital converter (ADC) 810, amplitude and time adjustment block 815, combiner 820, echo detector 825, digital delay block 830, and digital-to-analog converter (DAC) 840. A clock signal (not shown) synchronizes data transfers between ADC 805, ADC 810, amplitude and time adjustment block 815, combiner 820, echo detector 825, digital delay block 830, processor 835, and DAC 840.

For the downlink, echo canceller and signal processor 740 uses ADC 810 to obtain digital samples of the received signal from donor antenna 121 and stores the samples in memory (not shown). Echo canceller and signal processor 740 also uses ADC 805 to obtain digital samples of the echo signal received on donor antenna 122 and stores the samples in memory (not shown). The ADC sampling may be performed in the RF band of the received signal or at an intermediate frequency. The samples are taken over a time interval that represents the maximum propagation time expected for the latest arriving echo, generally less than 1 microsecond for indoor environments. To reduce the throughput of sampled data (bits/sec), sub-Nyquist sampling rates in either the RF band or in the IF band may be used. ADC 805 and 810 each have the dynamic range and sampling frequency to differentiate the original, non-delayed signal from the amplified, delayed echo.

Processor 835 controls amplitude and time adjustment circuit 815 to adjust the amplitude and time delay of the digitized echo signal, such that the echo signal is inverted and combined with the primary signal in combiner 820. Thus, any echo signal in the primary signal is minimized or removed. Echo detector 825 detects the presence of uncompensated echo signals in the output of combiner 820 using, for example, a matched filter, convolution or correlation techniques, digital subscriber line (DSL) echo detection and cancellation methods, or a combination of these techniques. Digital delay block 830 delays the compensated signal in order to de-correlate the echo signals received on donor antenna 122 from the primary signals received from donor antenna 121.

For multiple echo signals with different amplitudes and time delays, echo canceller and processor 740 adapts the relative amplitudes in different time slots to result in cancellation of echo signal from the first donor or server antenna.

For the uplink signals, echo canceller and processor 750 operates in a manner similar to that describe above for echo canceller and processor 740, except that uplink signals from server antennas 123 and 124 are processed. To avoid redundant and unnecessary description, the operation of echo canceller and processor 750 in the uplink need not be further explained.

Although the present invention has been described with an exemplary embodiment, various changes and modifications may be suggested to one skilled in the art. It is intended that the present invention encompass such changes and modifications as fall within the scope of the appended claims.

What is claimed is:

1. For use in a wireless network, a repeater capable of re-transmitting a downlink signal transmitted from a base station to a mobile station in a forward channel, said repeater comprising:
   a first antenna for receiving an incoming downlink signal from said base station;
   a second antenna for transmitting an outgoing downlink signal to said mobile station, wherein said second antenna is cross-polarized with respect to said first antenna; and
   a third antenna for receiving from said second antenna a downlink echo signal derived from said outgoing downlink signal, wherein said third antenna is co-polarized with respect to said second antenna and cross-polarized with respect to said first antenna.

2. The repeater as set forth in claim 1, wherein said repeater further comprises:
   a transceiver chain capable of down-converting said incoming downlink signal to a down-converted downlink signal and down-converting said downlink echo signal to a down-converted downlink echo signal, wherein said transceiver chain is further capable of using said down-converted downlink echo signal to reduce in said down-converted downlink signal a corresponding downlink echo signal derived from said outgoing downlink signal.

3. The repeater as set forth in claim 2, wherein said repeater is further capable re-transmitting an uplink signal transmitted from said mobile station to said base station in a reverse channel.

4. The repeater as set forth in claim 3, wherein said second antenna receives an incoming uplink signal from said mobile station and said first antenna transmits an outgoing uplink signal to said base station.

5. The repeater as set forth in claim 4, wherein said repeater further comprises:
   a fourth antenna for receiving from said first antenna an uplink echo signal derived from said outgoing uplink signal, wherein said fourth antenna is co-polarized with respect to said first antenna and cross-polarized with respect to said third antenna.

6. The repeater as set forth in claim 5, wherein said transceiver chain is further capable of down-converting said incoming uplink signal to a down-converted uplink signal and down-converting said uplink echo signal to a down-converted uplink echo signal and wherein said transceiver chain is further capable of using said down-converted uplink echo signal to reduce in said down-converted uplink signal a corresponding uplink echo signal derived from said outgoing uplink signal.

7. The repeater as set forth in claim 6, wherein said transceiver chain comprises an echo detector for detecting said corresponding downlink echo signal and said corresponding uplink echo signal.

8. The repeater as set forth in claim 7, wherein said transceiver chain delays transmission of said outgoing downlink signal in order to minimize said corresponding downlink echo signal in said down-converted downlink signal.

9. The repeater as set forth in claim 8, wherein said transceiver chain delays transmission of said outgoing uplink signal in order to minimize said corresponding uplink echo signal in said down-converted uplink signal.

10. The repeater as set forth in claim 9, wherein said wireless network is a time-division duplexing (TDD) wireless network and said repeater further comprises switching circuitry capable of coupling said first and third antennas to inputs of said transceiver chain and coupling said second antenna to an output of said transceiver chain during a downlink period of operation of said TDD wireless network, and wherein said switch circuitry is further capable of coupling said second and fourth antennas to said inputs of said transceiver chain and coupling said first antenna to said output of said transceiver chain during an uplink period of operation of said TDD wireless network.

11. A wireless network comprising:
   a plurality of base stations capable of communicating with a plurality of mobile stations in a coverage area of said wireless network; and
   a repeater capable of re-transmitting a downlink signal transmitted from a first one of said plurality of base stations to a first one of said plurality of mobile station in a forward channel, said repeater comprising:
      a first antenna for receiving an incoming downlink signal from said first base station;
      a second antenna for transmitting an outgoing downlink signal to said first mobile station, wherein said second antenna is cross-polarized with respect to said first antenna; and
      a third antenna for receiving from said second antenna a downlink echo signal derived from said outgoing downlink signal, wherein said third antenna is co-polarized with respect to said second antenna and cross-polarized with respect to said first antenna.

12. The wireless network as set forth in claim 11, wherein said repeater further comprises:

a transceiver chain capable of down-converting said incoming downlink signal to a down-converted downlink signal and down-converting said downlink echo signal to a down-converted downlink echo signal, wherein said transceiver chain is further capable of using said down-converted downlink echo signal to reduce in said down-converted downlink signal a corresponding downlink echo signal derived from said outgoing downlink signal.

13. The wireless network as set forth in claim 12, wherein said repeater is further capable re-transmitting an uplink signal transmitted from said first mobile station to said first base station in a reverse channel.

14. The wireless network as set forth in claim 13, wherein said second antenna receives an incoming uplink signal from said first mobile station and said first antenna transmits an outgoing uplink signal to said first base station.

15. The wireless network as set forth in claim 14, wherein said repeater further comprises:

a fourth antenna for receiving from said first antenna an uplink echo signal derived from said outgoing uplink signal, wherein said fourth antenna is co-polarized with respect to said first antenna and cross-polarized with respect to said third antenna.

16. The wireless network as set forth in claim 15, wherein said transceiver chain is further capable of down-converting said incoming uplink signal to a down-converted uplink signal and down-converting said uplink echo signal to a down-converted uplink echo signal and wherein said transceiver chain is further capable of using said down-converted uplink echo signal to reduce in said down-converted uplink signal a corresponding uplink echo signal derived from said outgoing uplink signal.

17. The wireless network as set forth in claim 16, wherein said transceiver chain comprises an echo detector for detecting said corresponding downlink echo signal and said corresponding uplink echo signal.

18. The wireless network as set forth in claim 17, wherein said transceiver chain delays transmission of said outgoing downlink signal in order to minimize said corresponding downlink echo signal in said down-converted downlink signal.

19. The wireless network as set forth in claim 18, wherein said transceiver chain delays transmission of said outgoing uplink signal in order to minimize said corresponding uplink echo signal in said down-converted uplink signal.

20. The wireless network as set forth in claim 19, wherein said wireless network is a time-division duplexing (TDD) wireless network and said repeater further comprises switching circuitry capable of coupling said first and third antennas to inputs of said transceiver chain and coupling said second antenna to an output of said transceiver chain during a downlink period of operation of said TDD wireless network, and wherein said switch circuitry is further capable of coupling said second and fourth antennas to said inputs of said transceiver chain and coupling said first antenna to said output of said transceiver chain during an uplink period of operation of said TDD wireless network.

* * * * *